US011407270B2

(12) United States Patent
Mater, Jr. et al.

(10) Patent No.: US 11,407,270 B2
(45) Date of Patent: Aug. 9, 2022

(54) ADJUSTABLE SPRING MOUNTING ASSEMBLY FOR VEHICLE

(71) Applicant: c/o RV Ride Control LLC, Elkhart, IN (US)

(72) Inventors: Robert F. Mater, Jr., Elkhart, IN (US); Auldreg Dismuke, Elkhart, IN (US)

(73) Assignee: RV Ride Control LLC, Elkhart, IN (US)

( * ) Notice: Subject to any disclaimer, the term of this patent is extended or adjusted under 35 U.S.C. 154(b) by 106 days.

(21) Appl. No.: 16/848,283

(22) Filed: Apr. 14, 2020

(65) Prior Publication Data
US 2020/0324608 A1  Oct. 15, 2020

Related U.S. Application Data

(60) Provisional application No. 62/833,918, filed on Apr. 15, 2019.

(51) Int. Cl.
*B60G 17/02* (2006.01)
*B60G 11/10* (2006.01)
*F16F 1/28* (2006.01)

(52) U.S. Cl.
CPC ............ *B60G 17/023* (2013.01); *B60G 11/10* (2013.01); *F16F 1/28* (2013.01); *B60G 2202/11* (2013.01); *B60G 2204/121* (2013.01); *B60G 2204/4402* (2013.01); *B60G 2204/61* (2013.01); *B60G 2500/30* (2013.01); *F16F 2230/0005* (2013.01)

(58) Field of Classification Search
CPC .. B60G 17/023; B60G 11/10; B60G 2202/11; B60G 2204/61; B60G 2500/30; B60G 2204/4402; B60G 2204/121; B60G 2204/43; F16F 2230/0005; F16F 1/28
See application file for complete search history.

(56) References Cited

U.S. PATENT DOCUMENTS

| 2,760,784 | A | * | 8/1956 | Talbert | B60G 5/01 280/680 |
| 2,997,114 | A | * | 8/1961 | Hines | A01D 29/00 171/116 |
| 3,175,706 | A | * | 3/1965 | Mathers | B65G 67/00 414/557 |
| 3,471,165 | A | * | 10/1969 | Raidel | B60G 5/04 280/687 |
| 3,510,149 | A | | 5/1970 | Raidel | |
| 3,554,596 | A | * | 1/1971 | Le Fevre | B62D 33/0604 296/190.05 |
| 3,730,548 | A | * | 5/1973 | Thaxton | B60G 11/465 280/124.163 |

(Continued)

*Primary Examiner* — Paul N Dickson
*Assistant Examiner* — Timothy Wilhelm
(74) *Attorney, Agent, or Firm* — Warren D. Schickli; Stites & Harbison, PLLC

(57) ABSTRACT

An adjustable spring mounting assembly includes an adjustment plate, including a receiver, an elongated axle alignment slot and at least one height adjustment aperture, and an alignment correction insert received and held in said receiver. The alignment correction insert includes a plurality of alignment correction apertures wherein a selected one of the plurality of alignment apertures is aligned with the elongated axle alignment slot to correct axle alignment of the vehicle.

10 Claims, 6 Drawing Sheets

(56) References Cited

U.S. PATENT DOCUMENTS

| | | | | |
|---|---|---|---|---|
| 3,730,550 A * | 5/1973 | Thaxton | | B60G 11/465 280/124.163 |
| 3,844,579 A * | 10/1974 | Cunha | | B60G 11/34 280/86.75 |
| 3,982,446 A | 9/1976 | Van Dyken | | |
| 4,065,153 A * | 12/1977 | Pringle | | B60G 9/003 280/86.5 |
| 4,267,896 A * | 5/1981 | Hendriksen | | B60G 9/003 267/66 |
| 4,334,697 A * | 6/1982 | Deweese | | B60G 21/055 280/124.107 |
| 4,397,478 A * | 8/1983 | Jensen | | B60G 11/465 267/31 |
| 4,412,690 A | 11/1983 | Prokop et al. | | |
| 4,417,426 A * | 11/1983 | Meng | | E04B 1/34352 52/126.7 |
| 4,505,010 A * | 3/1985 | Arenhold | | F16B 2/245 24/456 |
| 4,586,359 A * | 5/1986 | Parks | | B21D 1/14 269/71 |
| 4,718,691 A | 1/1988 | Specktor et al. | | |
| 4,846,495 A | 7/1989 | Laidely | | |
| 4,869,527 A | 9/1989 | Coddens | | |
| 4,872,653 A * | 10/1989 | Chuchua | | B60G 11/12 267/271 |
| 4,919,404 A | 4/1990 | Santini | | |
| 4,998,749 A | 3/1991 | Bockewitz | | |
| 5,002,305 A * | 3/1991 | Raidel | | B60G 9/003 280/124.116 |
| 5,007,660 A | 4/1991 | Orndorff, Jr. et al. | | |
| 5,016,906 A | 5/1991 | Cadden | | |
| 5,037,126 A | 8/1991 | Gottschalk et al. | | |
| 5,052,711 A * | 10/1991 | Pirkey | | B62D 17/00 280/86.753 |
| 5,074,161 A * | 12/1991 | Hancock | | B62D 1/192 74/492 |
| 5,255,611 A * | 10/1993 | Schneider | | B61F 5/24 105/199.2 |
| 5,271,638 A * | 12/1993 | Yale | | B60G 11/465 280/124.102 |
| 5,293,948 A * | 3/1994 | Crabb | | B62D 55/305 180/9.1 |
| 5,301,480 A * | 4/1994 | Oyama | | E04F 15/02482 52/126.6 |
| 5,301,977 A * | 4/1994 | Schlosser | | B62D 17/00 280/86.75 |
| 5,403,032 A * | 4/1995 | Hellwig | | B60G 7/04 267/31 |
| 5,542,511 A * | 8/1996 | Steiner | | B60M 1/225 191/41 |
| 5,599,038 A | 2/1997 | German | | |
| 5,617,072 A * | 4/1997 | McNeal | | B62D 53/068 280/441 |
| 5,634,605 A * | 6/1997 | Rubel | | B60P 3/20 248/228.1 |
| 5,647,606 A * | 7/1997 | Jordan | | B60G 15/07 280/86.751 |
| 5,683,098 A | 11/1997 | VanDenberg | | |
| 5,873,581 A * | 2/1999 | Yale | | B60G 17/0408 280/5.514 |
| 6,027,129 A | 2/2000 | Kleinschmit et al. | | |
| D422,253 S * | 4/2000 | Boykin | | D12/179 |
| 6,082,750 A * | 7/2000 | Merkler | | B60G 9/00 267/260 |
| 6,139,092 A * | 10/2000 | Doner | | B60G 11/10 293/138 |
| 6,158,761 A * | 12/2000 | King | | B60D 1/01 280/495 |
| 6,220,580 B1 | 4/2001 | Balczun | | |
| 6,264,231 B1 * | 7/2001 | Scully | | B60G 5/047 280/680 |
| 6,272,898 B1 * | 8/2001 | Soyk | | B21D 1/12 72/295 |
| 6,386,565 B1 * | 5/2002 | Kugler | | B60G 7/003 280/124.165 |
| 6,409,189 B1 | 6/2002 | Orimoto et al. | | |
| 6,434,907 B1 * | 8/2002 | Simboli | | B62D 24/02 296/146.6 |
| 6,527,287 B2 | 3/2003 | Hedenberg | | |
| 6,659,479 B1 * | 12/2003 | Raidel, II | | B60G 7/02 280/124.16 |
| 6,682,280 B1 * | 1/2004 | Lindsay | | B62D 21/12 410/100 |
| 6,698,775 B2 * | 3/2004 | Ness | | B60G 7/02 248/125.3 |
| 6,709,014 B2 * | 3/2004 | Svartz | | B60G 11/27 280/124.116 |
| 6,764,087 B2 * | 7/2004 | Assaf | | B60G 11/04 267/242 |
| D494,894 S * | 8/2004 | Carlson | | D12/160 |
| 6,966,612 B2 | 11/2005 | Philpott | | |
| 7,093,882 B2 * | 8/2006 | Lake | | B60J 7/1621 292/113 |
| 7,100,933 B2 * | 9/2006 | Zackovich | | B60P 3/12 280/402 |
| 7,213,825 B2 | 5/2007 | Hitt et al. | | |
| 7,296,809 B2 * | 11/2007 | Zebolsky | | B60G 7/006 280/124.116 |
| 7,296,821 B2 * | 11/2007 | Fenton | | B60G 5/047 280/680 |
| 7,331,588 B2 | 2/2008 | Johnson | | |
| 7,415,771 B2 | 8/2008 | Harrill | | |
| 7,467,473 B2 | 12/2008 | Harrill et al. | | |
| 7,481,407 B2 * | 1/2009 | Kim | | B60G 17/019 248/225.11 |
| 7,513,517 B2 | 4/2009 | Barton et al. | | |
| 7,537,226 B1 * | 5/2009 | Collazo | | B60G 11/12 267/260 |
| 7,611,107 B2 * | 11/2009 | Howell | | B62D 27/065 248/200 |
| 7,651,107 B1 * | 1/2010 | Chapin | | F16F 1/30 280/124.165 |
| 7,669,867 B2 * | 3/2010 | Kuraishi | | F16F 3/093 280/124.175 |
| 7,673,891 B2 | 3/2010 | Johns | | |
| 7,891,679 B2 * | 2/2011 | Svartz | | B60G 9/003 280/86.75 |
| 7,905,056 B2 * | 3/2011 | Kornfield | | E05D 15/24 49/197 |
| 8,376,380 B2 * | 2/2013 | Smith | | B60G 11/10 280/124.104 |
| 8,511,929 B2 * | 8/2013 | Raye | | B60C 23/10 403/385 |
| 8,567,772 B2 | 10/2013 | McCarthy et al. | | |
| 8,590,912 B2 * | 11/2013 | McCarthy | | B60G 11/10 280/124.175 |
| 8,708,353 B1 * | 4/2014 | Vey | | B62K 5/027 280/86.751 |
| 8,733,768 B1 * | 5/2014 | Shoulders | | B60G 7/02 280/86.757 |
| 8,764,036 B2 * | 7/2014 | Muckelrath | | F16F 9/00 280/124.116 |
| 8,944,447 B2 * | 2/2015 | Khoury | | B62D 17/00 280/86.75 |
| 8,979,105 B2 * | 3/2015 | McCarthy | | B60G 11/12 280/124.175 |
| 8,998,160 B1 * | 4/2015 | Vanwey | | B65G 21/02 248/354.5 |
| 9,452,640 B2 * | 9/2016 | Mater, Jr. | | B60B 35/007 |
| 9,555,844 B2 * | 1/2017 | Hicks | | B62D 53/068 |
| 9,677,585 B2 * | 6/2017 | Broussard | | F16B 7/0493 |
| 10,100,861 B2 * | 10/2018 | Zhang | | F16B 7/0493 |
| 10,370,033 B1 * | 8/2019 | Klein | | B62D 53/068 |
| 2003/0132593 A1 | 7/2003 | Ross et al. | | |
| 2005/0023790 A1 * | 2/2005 | Galazin | | B60G 7/02 280/124.116 |

(56) References Cited

U.S. PATENT DOCUMENTS

| | | | |
|---|---|---|---|
| 2005/0093286 A1* | 5/2005 | Oh | B60G 15/068 |
| | | | 280/788 |
| 2005/0156398 A1* | 7/2005 | Ramsey | B60G 9/003 |
| | | | 280/124.116 |
| 2005/0173892 A1* | 8/2005 | Terminello | B60P 3/1033 |
| | | | 280/490.1 |
| 2006/0249923 A1 | 11/2006 | Ramsey | |
| 2007/0052195 A1* | 3/2007 | Collazo | B60G 11/12 |
| | | | 280/124.175 |
| 2010/0219677 A1 | 9/2010 | Borgi | |
| 2011/0068524 A1 | 3/2011 | McCarthy et al. | |
| 2011/0095501 A1 | 4/2011 | Piehl et al. | |
| 2011/0175313 A1* | 7/2011 | Pierce | B60G 9/003 |
| | | | 280/124.11 |
| 2012/0153589 A1* | 6/2012 | McCarthy | B60G 11/10 |
| | | | 280/86.75 |

\* cited by examiner

ADJUSTABLE SPRING MOUNTING ASSEMBLY FOR VEHICLE

RELATED APPLICATION

This application claims priority to U.S. Provisional Patent Application Ser. No. 62/833,918 filed on Apr. 15, 2019 which is hereby incorporated by reference in its entirety.

TECHNICAL FIELD

This document relates generally to the vehicle field and, more particularly, to an adjustable spring mounting assembly to retain the end of a leaf spring to the frame of a vehicle as well as to a method of aligning the axle or axles of a vehicle.

BACKGROUND

Recreational vehicles (RVs) and trailers are relatively common in the art. Many suffer from axle alignment problems. In fact, many RV's leave the factory in an out of alignment condition. The out of alignment condition may be produced as a result of a number of factors including, but not limited to, unbalanced loading caused by RV floor plan arrangement or slide out placement. Sometimes the frame of the vehicle is wrenched out of square when floors, walls and slide outs are attached. In still other instances the recreational vehicle may suffer from faulty placement of spring hangers and tie plates. Still further, poor quality control of running gear components may cause alignment problems.

Even if a recreational vehicle or trailer leaves the factory in proper alignment, misalignment problems may develop later. Such later developing problems may result from, for example, road hazard damage, worn out spring bushings and/or spring fatigue resulting from unbalanced loading.

Trailer or axle misalignment is a very undesirable condition with many negative ramifications. Specifically trailer or axle misalignment adversely impacts tire tracking resulting in reduced fuel economy and tire service life. Misalignment can also increase the potential for tire blowouts which are capable of causing a lot of expensive collateral damage to suspension parts, fender skirts, holding tanks, stabilizers and other under-carriage components. Misaligned axles can also lead to tire vibration that causes premature wear to suspension components. The added vibration may also contribute to premature failure of RV contents such as TVs, satellite gear, refrigerators, microwaves, computers, air conditioning and heating units. Further, vibrations from axle misalignment may also weaken propane and water connections, cabinet mounts and fastener connections throughout the RV thereby reducing the life and effectiveness of fire alarms, $CO_2$ alarms and electrical systems.

The present invention relates to an adjustable spring mounting assembly that may be utilized to correctly align the axle or axles of a recreational vehicle or trailer and thereby eliminate all of the deleterious consequences produced by such a condition.

SUMMARY

In accordance with the purposes and benefits described herein, there is provided a new and improved adjustable spring assembly for a motor vehicle. That adjustable spring assembly comprises (a) a first adjustment plate including a receiver, an elongated axle alignment slot and at least one height adjustment aperture and (b) an alignment correction insert received and held in the receiver. The alignment correction insert includes a plurality of alignment correction apertures wherein a selected one of said plurality of alignment apertures is aligned with said elongated axle alignment slot to correct axle alignment of the vehicle.

In one or more of the many possible embodiments of the adjustable spring mounting assembly, the alignment correction insert includes a body having a first face, a second face, a first side, a second side, a third side and a fourth side.

In one or more of the many possible embodiments of the adjustable spring mounting assembly, the alignment correction insert includes a first centerline extending between said first side and said second side. In one or more of the many possible embodiments of the adjustable spring mounting assembly, the alignment correction insert includes a second centerline extending between said third side and said fourth side.

In one or more of the many possible embodiments of the adjustable spring mounting assembly, the plurality of alignment correction apertures includes a first aperture centered on said first centerline a distance D from said second centerline.

In one or more of the many possible embodiments of the adjustable spring mounting assembly, the first centerline and the second centerline divide the body into a first quadrant, a second quadrant, a third a quadrant and a fourth quadrant and the first aperture extends partially into the first quadrant and the second quadrant.

In one or more of the many possible embodiments of the adjustable spring mounting assembly, the plurality of alignment correction apertures includes a second aperture in the first quadrant the distance D from the first centerline.

In one or more of the many possible embodiments of the adjustable spring mounting assembly, the plurality of alignment correction apertures includes a third aperture in the third quadrant the distance D from the first centerline.

In one or more of the many possible embodiments of the adjustable spring mounting assembly, the plurality of alignment correction apertures includes a fourth aperture in the third quadrant the distance D from the second centerline.

In one or more of the many possible embodiments of the adjustable spring mounting assembly, the plurality of alignment correction apertures includes a fifth aperture in the fourth quadrant the distance D from the first centerline.

In one or more of the many possible embodiments of the adjustable spring mounting assembly, the receiver is an open channel formed by the first adjustment plate.

In one or more of the many possible embodiments of the adjustable spring mounting assembly, the adjustment plate further includes a mounting aperture to prevent relative rotation of the adjustment plate.

In one or more of the many possible embodiments of the adjustable spring mounting assembly, a first fastener is received in the at least one height adjustment aperture, a second fastener is received in the mounting aperture and a third fastener is received in the selected one of the plurality of alignment apertures and the elongated axle alignment slot.

In one or more of the many possible embodiments of the adjustable spring mounting assembly, the adjustable spring mounting assembly further includes a second adjustment plate.

In one or more of the many possible embodiments of the adjustable spring mounting assembly, the adjustable spring mounting assembly further includes a second alignment correction insert received and held by the second adjustment plate.

In one or more of the many possible embodiments of the adjustable spring mounting assembly, the second adjustment plate has an identical structure to the first adjustment plate.

In one or more of the many possible embodiments of the adjustable spring mounting assembly, the second alignment correction insert has an identical structure to the first alignment correction insert.

In accordance with an additional aspect, an alignment correction insert is provided. That alignment correction insert is adapted for correcting alignment of an axle of a vehicle. The alignment correction insert comprises a body having a first face, a second face, a first side, a second side, a third side and a fourth side, a first centerline extending between the first side and the second side, a second centerline extending between the third side and the fourth side and a plurality of alignment correction apertures wherein all of the plurality of alignment correction apertures are located a distance D from either the first centerline or the second centerline.

In one or more of the many possible embodiments of the alignment correction insert, the first centerline and the second centerline divide the body into a first quadrant, a second quadrant, a third a quadrant and a fourth quadrant. The plurality of alignment correction apertures may include a first aperture centered on the first centerline a distance D from the second centerline.

In one or more of the many possible embodiments of the alignment correction insert, the plurality of alignment correction apertures includes a second aperture in the first quadrant the distance D from the first centerline.

In one or more of the many possible embodiments of the alignment correction insert, the plurality of alignment correction apertures includes a third aperture in the third quadrant the distance D from the first centerline.

In one or more of the many possible embodiments of the alignment correction insert, the plurality of alignment correction apertures includes a fourth aperture in the third quadrant the distance D from the second centerline.

In one or more of the many possible embodiments of the alignment correction insert, the plurality of alignment correction apertures includes a fifth aperture in the fourth quadrant the distance D from the first centerline.

In the following description there are shown and described several possible embodiments of the new and improved adjustable spring mounting assembly and alignment correction insert. As it should be realized, the adjustable spring mounting assembly and alignment correction insert are capable of other, different embodiments and their several details are capable of modification in various obvious aspects without departing from the adjustable spring mounting assembly and alignment correction insert as set forth and described in the following claims. Accordingly, the drawing figures and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the adjustable spring mounting assembly and the alignment correction insert and together with the description serve to explain certain principles thereof.

FIG. 3b is a plan view of the second opposite face of the first alignment correction insert illustrated in FIG. 3a.

DETAILED DESCRIPTION

Figure 1:
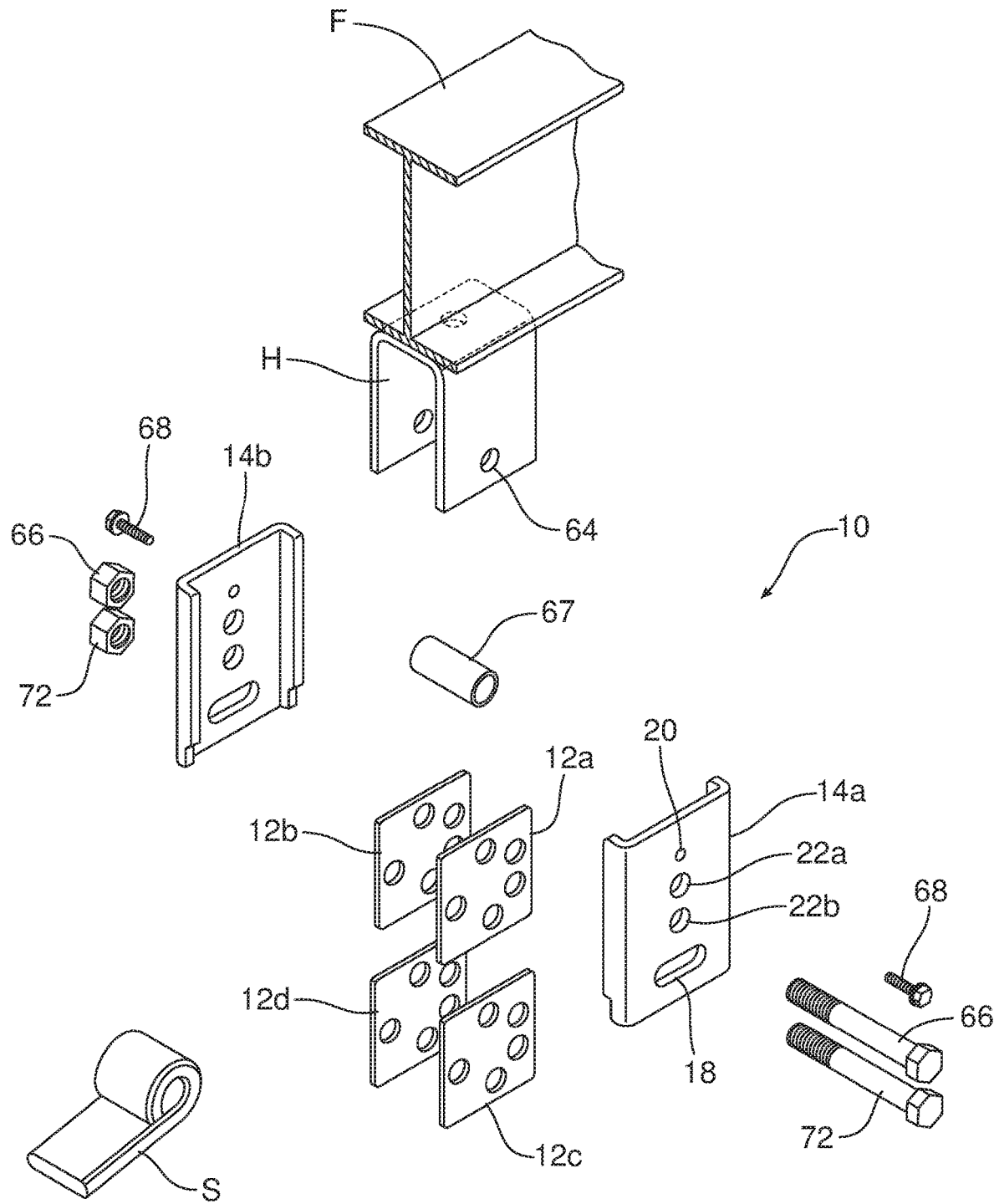
FIG. 1 is an exploded perspective view of the adjustable spring mounting assembly and the frame and hanger bracket of a vehicle.

Reference is now made to FIGS. 1-5 which illustrate (a) the new and improved adjustable spring mounting assembly 10 and new and improved alignment correction insert 12a of that assembly, (b) the vehicle frame F and hanger bracket H upon which the assembly 10 is mounted and (c) the leaf spring S held by the assembly.

As illustrated, the adjustable spring mounting assembly 10 includes a first adjustment plate 14a, a second adjustment plate 14b, a first alignment correction insert 12a, and a second alignment correction insert 12b.

Figure 2:
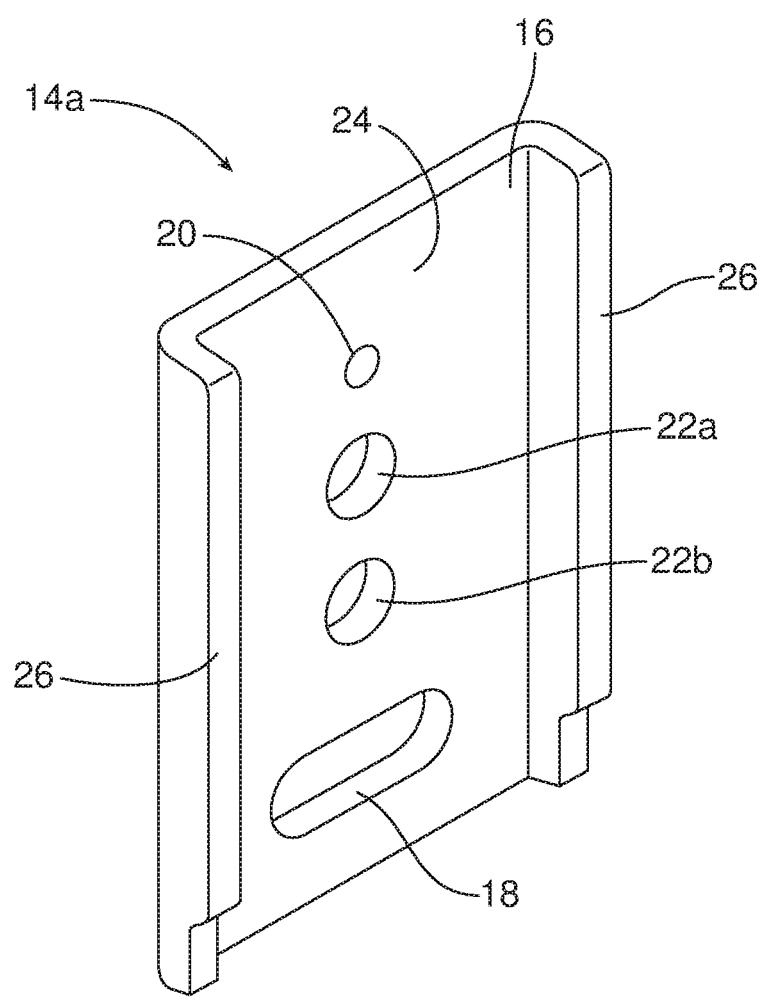
FIG. 2 is a detailed perspective view of the first adjustment plate of the adjustable spring mounting assembly illustrated in FIG. 1.

As best illustrated in FIG. 2, the first adjustment plate 14a includes a receiver 16, an elongated axle alignment slot 18, a mounting aperture 20 and at least one height adjustment aperture 22a, 22b. While two height adjustment apertures 22a and 22b are provided in the illustrated embodiment, it should be appreciated that a different number may be provided if desired.

In the illustrated embodiment, the receiver 16 is an open channel formed by a face 24 and two opposed ribs 26 of the first adjustment plate 14a. The second adjustment plate 14b has a structure identical to the first adjustment plate 14a.

Figure 3A:
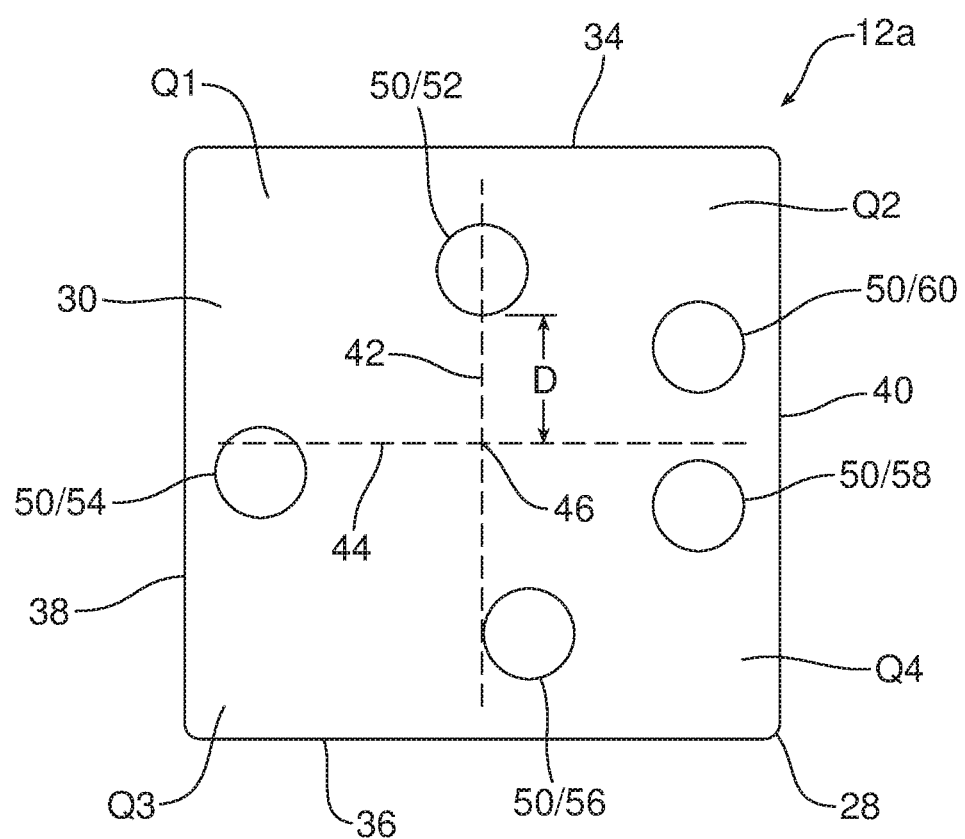
FIG. 3a is a detailed plan view of a first face of the first alignment correction insert of the adjustable spring mounting assembly illustrated in FIG. 1.
Figure 3B:
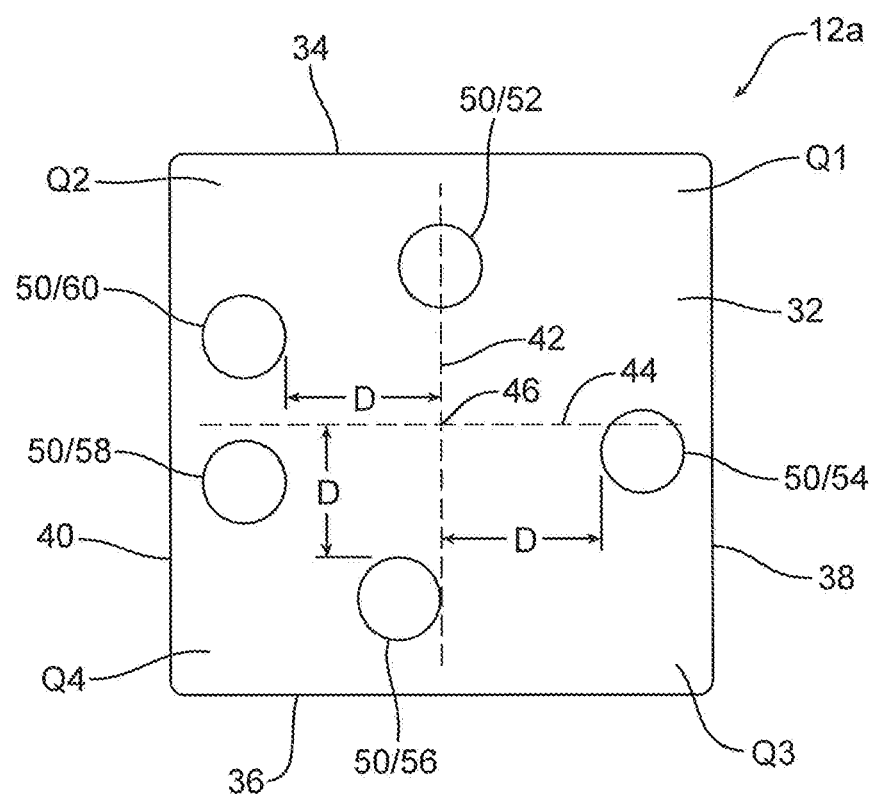

As best illustrated in FIGS. 3a and 3b, the first alignment correction insert 12a includes a body 28 having a first face 30, a second face 32, a first side 34, a second side 36, a third side 38 and a fourth side 40. A first centerline 42 extends between the first side 34 and the second side 36. A second centerline 44 extends between the third side 38 and the fourth side 40. The two centerlines 42, 44 cross at the center point 46 of the first alignment correction insert 12a and divide the first alignment correction insert into four quadrants: Q1, Q2, Q3, and Q4.

The first alignment correction insert also includes a plurality of alignment correction apertures generally designated by reference number 50. More specifically, the plurality of alignment correction apertures 50 includes a first aperture 52, a second aperture 54, a third aperture 56, a fourth aperture 58 and a fifth aperture 60.

In the illustrated embodiment, the first aperture 52 is centered on the first centerline 42 a distance D from the second centerline 44. The first aperture 52 extends partially into the first and second quadrants Q1 and Q2.

The second aperture 54 is provided primarily in the third quadrant Q3 the distance D from the first centerline 42. The third aperture 56 is provided in the fourth quadrant Q4 the distance D from the second centerline 44. The fourth aperture 58 is provided in the fourth quadrant Q4 the distance D from the first centerline 42. The fifth aperture 60 is provided in the second quadrant Q4 the distance D from the first centerline 42.

As will become apparent from the following description, one adjusts the axle alignment of the vehicle by selecting one of the plurality of apertures 50 in the first alignment correction insert 12a which is aligned with the elongated axle alignment slot 18 in the first adjustment plate 14a.

Figure 4:
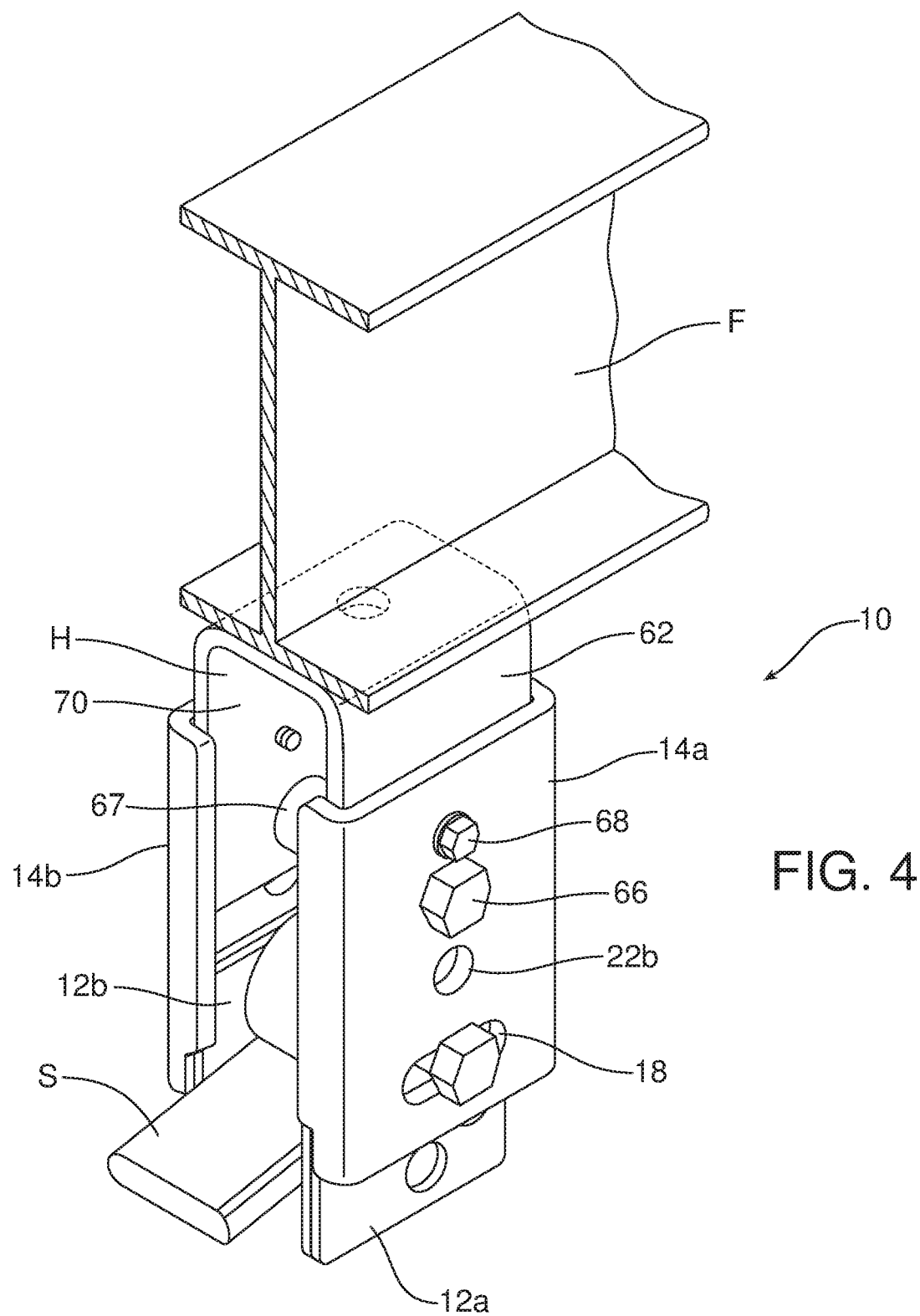
FIG. 4 is a perspective view illustrating the mounting assembly of FIG. 1 fully assembled and holding a leaf spring of the vehicle.
Figure 5:
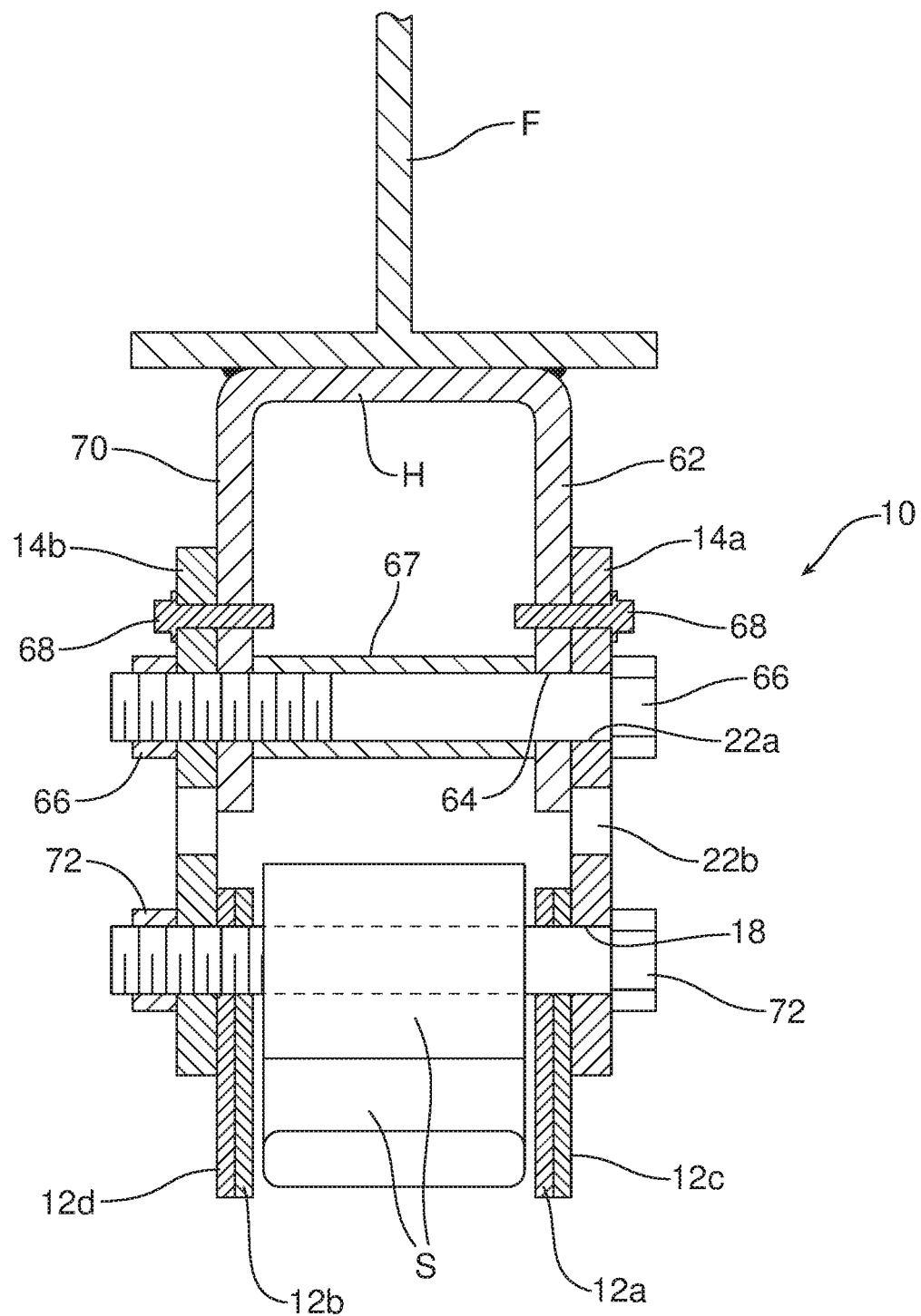
FIG. 5 is a cross sectional view illustrating the adjustable spring mounting assembly holding a leaf spring of the vehicle.

As illustrated in FIGS. 1, 4 and 5, the adjustable spring mounting assembly 10 is mounted to the hanger bracket H carried on or welded to the frame F of the vehicle. For purposes of this document, the term vehicle refers to a trailer or recreational vehicle of any type including one or more axles that must be kept in alignment to ensure best performance.

As illustrated, the first adjustment plate 14a is mounted to the outer face of the first leg 62 of the hanger H. More specifically, the first leg 62 is received within the receiver/open channel 16 formed by the face 24 and two opposed ribs 26. One of the height adjustment apertures 22a or 22b is aligned with the mounting aperture 64 provided in the hanger bracket H depending upon the desired height adjustment to be provided by the adjustable spring mounting assembly 10. In one possible embodiment, the height adjustment apertures 22a, 22b provide a height adjustment of either 1.25 inches/3.175 cm or 2.25 inches/5.715 cm.

A first fastener 66 is passed through the selected height adjustment aperture, aperture 22a in the illustration, and the hanger mounting aperture 64. The first fastener 66 is also passed through the spacer tube 67 which maintains the spacing between the legs 62 and 70 of the hanger bracket H when the fastener 66 is tightened in position. A second fastener 68 is received in the mounting aperture 20. That second fastener 68 may be a self-tapping screw or bolt that engages in the first leg 62 of the hanger bracket H to secure the first adjustment plate 14a against rotation relative to the hanger bracket.

Next one positions the first alignment correction insert 12a in the receiver 16 on the inner face 24 of the first adjustment plate 14a. The selected aperture of the plurality of apertures 50 to be aligned with the elongated axle alignment slot 18 is the one that provides any needed adjustment to properly align the axle of the vehicle.

In the illustrated embodiment, the first aperture 52 provides no adjustment. The second aperture 54 provides an adjustment of ⅛ inch or 0.317 cm. The third aperture 56 provides an adjustment of ¼ inch or 0.635 cm. The fourth aperture 58 provides an adjustment of ⅜ inch or 0.9525 cm. The fifth aperture 60 provides an adjustment of ½ inch or 1.27 cm. The adjustment can be in the fore or aft direction depending upon which face 30, 32 of the first alignment correction insert 12a is turned toward the first adjustment plate 14a.

The second adjustment plate 14b and the second alignment correction plate 12b are secured in the same manner along the outer face of the second leg 70 of the hanger bracket H, once again providing any desired correction to the alignment of the vehicle axle. A third fastener 72 is then secured through the elongated axle alignment slots 18 in the two adjustment plates 14a, 14b, the selected one of the plurality of apertures 50 in the two alignment correction inserts 12a, 12b and the bushing B in the eye E of the spring S. The same procedure is then repeated on the opposite side of the vehicle with respect to the opposite spring. In multi-axle vehicles, this procedure is repeated for each axle, and each spring mounting point.

In the illustrated embodiment, a third alignment correction insert 12c is butted against the first alignment insert 12a and a fourth alignment insert 12d is butted against the second alignment insert 12b in order to accommodate the gap or spacing between the two legs 62, 70 of the hanger bracket H. It should be appreciated that one, two or even more alignment inserts $12_a$-$12_n$ may be used depending upon the leg spacing and spring eye width encountered during any particular application.

Consistent with the above description of the adjustable spring mounting assembly 10 and the alignment correction insert 12a, a method is provided for adjusting the alignment of an axle of a vehicle. The steps of that method are presented below.

Installation

Support the trailer with approved jack stands rated for your trailer's weight. Trailer will need to be raised 2.0-2.5 inches to install the adjustable spring mounting assembly 10. On some occasions, the trailer's leveling system can be used.

Remove tire to access the hanger.

Use a jack to secure the axle from moving so the spring eye bolt can be removed.

Lower axle to clear the spring from its hanger.

Inspect the spring eye busing before reinstalling the spring and replace if warranted.

Attach an adjustment plate 14a to the front of the spring hanger H using a bolt 66. Thread bolt 66 thru the appropriate hole 22a or 22b in the adjustment plate 14a and the hole 64, thru the hanger H. Insert the bolt 66 thru a spacer tube 67 inside the hanger H. Continue to thread bolt 66 out the back of the hanger H and capture with the second adjustment plate 14b. Complete the attachment with a Nylock nut 69.

Align the adjustment plate to the hanger H and install ⅜' self-tapping screw 68 thru the top hole 20. This prevents the adjustment plate 14a from moving. Do the same on the other adjustment plate 14b. Tighten bolts 66 so the center spacer tube 67 is snug.

Raise the axle so as to align to the lower elongated slot 18 in the adjustment plate 14a.

Install the alignment correction inserts 12a, 12b between the eye of the leaf spring S and the adjustment plates 14a, 14b so as to align axles to conform to your adjustment plan.

Move the axle front to back to align to the correction insert setting that corresponds with your alignment correction plan. The alignment correction inserts 12a, 12b are designed to be turned or flipped over to give you the exact setting on the left. After inserting correction inserts 12a, 12b both front and back, tighten spring eye bolt 72 with Nylock nut 73. Leave a small gap around spring eye so it can move freely.

Tighten spring eye bolt 72 so there is a small gap between hangers H and spring S. This will allow springs to move freely.

Repeat on all spring hangers.

Lower trailer to ground and move forward one revolution of tires and repeat measurement second step for each succeeding axle two and three if a multiaxled vehicle.

In order to determine the adjustment to be made, look at your measurements to see which way the axles should be moved to align axles. One installs the adjustment plates 14a, 14b following the Adjustment Plan example below. In this example, the Curb Side is used for the base measurements.

Step One: Adjust the front axle so that the Curb and Street Side measurements are the same. This moves the front axle into a position perpendicular to the thrust vector created by the tow vehicle when traveling straight forward. This also places the front trailer axle parallel to the axles on the tow vehicle.

| Curb Side: | Couple/King Pin | | Street Side | Difference | Adjustment Plan | Result |
|---|---|---|---|---|---|---|
| [C] Distance to Front Tire | | | [S] | S – C | S+ | |
| 24' 6.25" | ← | → | 24' 5.875" | −0.375 | 0.375 | 24' 6.25" |
| | | | | | Forward | |

Step Two: Since we moved the Street Side axle forward 0.375 inches forward in step one, we have created a new adjustment requirement to achieve a parallel result with the front axle, [0.50 plus 0.375=0.875] rearward.

| Distance Hub to Hub | | | | Adjustments | | |
|---|---|---|---|---|---|---|
| 35.75" | ← | → | 35.75" | −0.5 | −0.875 | 35.75" |
| | | | | | Rearward | |

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An adjustable spring mounting assembly for a vehicle, comprising: a first adjustment plate including a receiver, an elongated axle alignment slot and at least one height adjustment aperture; and
   an alignment correction insert received and held in said receiver, said alignment correction insert including a plurality of alignment correction apertures wherein a selected one of said plurality of alignment apertures is aligned with said elongated axle alignment slot to correct axle alignment of the vehicle wherein (a) said alignment correction insert includes a body having a first face, a second face, a first side, a second side, a third side and a fourth side, (b) said alignment correction insert includes a first centerline extending between said first side and said second side, (c) said alignment correction insert includes a second centerline extending between said third side and said fourth side, (d) said plurality of alignment correction apertures includes a first aperture centered on said first centerline a distance D from said second centerline, (e) said first centerline and said second centerline divide the body into a first quadrant, a second quadrant, a third a quadrant and a fourth quadrant and said first aperture extends partially into said first quadrant and said second quadrant, (f) wherein the plurality of alignment correction apertures includes a second aperture primarily in said third quadrant the distance D from the first centerline, (g) the plurality of alignment correction apertures includes a third aperture in said fourth quadrant the distance D from the first centerline and (h) the plurality of alignment correction apertures includes a fourth aperture in said fourth quadrant the distance D from the second centerline.

2. The adjustable spring mounting assembly of claim 1, wherein the plurality of alignment correction apertures includes a fifth aperture in said second quadrant the distance D from the first centerline.

3. The adjustable spring assembly of claim 2, wherein said receiver is an open channel formed by said first adjustment plate.

4. The adjustable spring assembly of claim 3, wherein said adjustment plate further includes a mounting aperture to prevent relative rotation of said adjustment plate.

5. The adjustable spring assembly of claim 4, including a first fastener received in said at least one height adjustment aperture, a second fastener received in said mounting aperture and a third fastener received in said selected one of said plurality of alignment apertures and said elongated axle alignment slot.

6. The adjustable spring assembly of claim 5, further including a second adjustment plate.

7. The adjustable spring assembly of claim 6, further including a second alignment correction insert received and held by the second adjustment plate.

8. The adjustable spring assembly of claim 7 wherein the second adjustment plate has an identical structure to the first adjustable plate.

9. The adjustable spring assembly of claim 8, wherein the second alignment correction insert has an identical structure to the first alignment correction insert.

10. An alignment correction insert adapted for correcting alignment of an axle of a vehicle, comprising: a body having a first face, a second face, a first side, a second side, a third side and a fourth side, a first centerline extending between said first side and said second side, a second centerline extending between said third side and said fourth side and a plurality of alignment correction apertures wherein all of said plurality of alignment correction apertures are located a distance D from either said first centerline or said second centerline wherein (a) said first centerline and said second centerline divide the body into a first quadrant, a second quadrant, a third quadrant and a fourth quadrant and said plurality of alignment correction apertures includes a first aperture centered on said first centerline a distance D from said second centerline and (b) wherein the plurality of alignment correction apertures includes a second aperture in said first quadrant the distance D from the first centerline, a third aperture in said third quadrant the distance D from the first centerline, a fourth aperture in said third quadrant the distance D from the second centerline and a fifth aperture in said fourth quadrant the distance D from the first centerline.

* * * * *